US012580245B2

(12) United States Patent
Lee et al.

(10) Patent No.: US 12,580,245 B2
(45) Date of Patent: Mar. 17, 2026

(54) BATTERY MODULE

(71) Applicant: LG ENERGY SOLUTION, LTD., Seoul (KR)

(72) Inventors: Jung Hoon Lee, Daejeon (KR); Doo Han Yoon, Daejeon (KR); Jae Hun Yang, Daejeon (KR); Jong Soo Ha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 518 days.

(21) Appl. No.: 18/025,602

(22) PCT Filed: Sep. 16, 2021

(86) PCT No.: PCT/KR2021/012746
§ 371 (c)(1),
(2) Date: Mar. 9, 2023

(87) PCT Pub. No.: WO2022/060145
PCT Pub. Date: Mar. 24, 2022

(65) Prior Publication Data
US 2023/0361381 A1      Nov. 9, 2023

(30) Foreign Application Priority Data

Sep. 17, 2020    (KR) ........................ 10-2020-0119949

(51) Int. Cl.
*H01M 10/6555*        (2014.01)
*H01M 10/613*        (2014.01)
(Continued)

(52) U.S. Cl.
CPC ..... *H01M 10/6555* (2015.04); *H01M 10/613* (2015.04); *H01M 10/6551* (2015.04); *H01M 50/204* (2021.01); *H01M 50/264* (2021.01)

(58) Field of Classification Search
CPC ........... H01M 10/6555; H01M 10/613; H01M 10/6551; H01M 10/6554; H01M 10/6556;
(Continued)

(56) References Cited

U.S. PATENT DOCUMENTS

| | | | |
|---|---|---|---|
| 7,393,609 B2 | 7/2008 | Higashino et al. | |
| 2005/0123828 A1 | 6/2005 | Oogami et al. | |

(Continued)

FOREIGN PATENT DOCUMENTS

| | | | |
|---|---|---|---|
| JP | 2005-116438 A | 4/2005 | |
| JP | 2009301877 A | 12/2009 | |

(Continued)

OTHER PUBLICATIONS

EESR dated Oct. 20, 2023 from the EPO corresponding European Patent Application No. 21869767.0.
(Continued)

*Primary Examiner* — Lisa S Park
(74) *Attorney, Agent, or Firm* — Morgan, Lewis & Bockius LLP

(57) ABSTRACT

A battery module may effectively cool the plurality of battery cells by using the heat sink. The battery module includes an outer case having an accommodation space therein; an inner case having a storage space therein, the inner case being in the accommodation space; a plurality of battery cells in the storage space; a heat sink in the accommodation space with the heat sink being between the inner case and one side wall of the outer case and configured to cool the battery cells; and a pressing part in the accommodation space and having at least a portion between the other side wall of the outer case, which is opposite to the one side wall, and the inner case. The pressing part is configured to press the inner case toward the heat sink.

7 Claims, 4 Drawing Sheets

(51) Int. Cl.
H01M 10/6551 (2014.01)
H01M 50/204 (2021.01)
H01M 50/264 (2021.01)

(58) Field of Classification Search
CPC ............. H01M 50/204; H01M 50/264; H01M 50/244; H01M 50/289; H01M 50/20; Y02E 60/10
See application file for complete search history.

(56) References Cited

U.S. PATENT DOCUMENTS

| | | | |
|---|---|---|---|
| 2011/0200862 A1 | 8/2011 | Kurosawa | |
| 2013/0004822 A1 | 1/2013 | Hashimoto et al. | |
| 2014/0295241 A1 | 10/2014 | Tao et al. | |
| 2015/0214569 A1 | 7/2015 | Kim et al. | |
| 2016/0141737 A1* | 5/2016 | Kubota | H01M 10/613 |
| | | | 429/120 |
| 2018/0115030 A1* | 4/2018 | Janarthanam | H01M 10/625 |
| 2019/0074562 A1 | 3/2019 | Kim et al. | |
| 2020/0028130 A1 | 1/2020 | Marutani | |
| 2020/0067038 A1 | 2/2020 | Chi et al. | |
| 2020/0127249 A1 | 4/2020 | Yoon et al. | |
| 2020/0358057 A1 | 11/2020 | Lindstrom | |
| 2021/0121808 A1 | 4/2021 | Kim et al. | |

FOREIGN PATENT DOCUMENTS

| | | |
|---|---|---|
| JP | 2011-171029 A | 9/2011 |
| JP | 2013-12441 A | 1/2013 |
| JP | 2014093238 A | 5/2014 |
| JP | 2014-157721 A | 8/2014 |
| JP | 2014-192010 A | 10/2014 |
| JP | 2014-238928 A | 12/2014 |
| JP | 2015-22830 A | 2/2015 |
| JP | 6286212 B2 | 2/2018 |
| JP | 2019-514192 A | 5/2019 |
| JP | 6537730 B2 | 7/2019 |
| JP | 2020009584 A | 1/2020 |
| KR | 10-2014-0024579 A | 3/2014 |
| KR | 10-2014-0077272 A | 6/2014 |
| KR | 10-2014-0110233 A | 9/2014 |
| KR | 10-1533992 B1 | 7/2015 |
| KR | 10-2015-0130695 A | 11/2015 |
| KR | 10-2018-0119990 A | 11/2018 |
| KR | 10-2019-0078094 A | 7/2019 |
| KR | 10-2050025 B1 | 1/2020 |
| KR | 10-2020-0025719 A | 3/2020 |
| WO | 2019-230325 A1 | 12/2019 |

OTHER PUBLICATIONS

International Search Report (with partial translation) and Written Opinion dated Jan. 4, 2022, issued in corresponding International Patent Application No. PCT/KR2021/012746.
Notice of Allowance dated Oct. 21, 2024 of Japanese Patent Application No. 2023-501658 claiming priority to Korean Patent Application No. 10-2020-0119949 for your reference.
Office Action issued Feb. 19, 2024 for Japanese Patent Application No. 2023-501658 (Note: WO 2019/230325 A1 was cited in a prior IDS.).
Second Office Action dated May 13, 2024 issued in Japanese Patent Application No. 2023-501658.

* cited by examiner (a)

(b)

(a)

(b)

(a)

(b)

BATTERY MODULE

BACKGROUND

The present disclosure relates to a battery module, and more particularly, to a battery module capable of effectively cooling a plurality of battery cells by using a heat sink.

In general, a battery module includes a plurality of battery cells. The battery cell that is an electrode assembly includes a positive electrode and negative electrode collector, a separator, an active material, and an electrolyte to allow repeated charge and discharge by an electrochemical reaction between components.

Here, the battery cell generates heat in a process of charging or discharging. The battery cell may be accelerated in deterioration when the generated heat is not removed, and fired or exploded in some cases.

Typically, the battery cells are cooled by using a heat sink. That is, as a thermal interface material (TIM) is installed between a case for storing the battery cells and the heat sink, the battery cells are indirectly cooled by the heat sink. However, as a distance between the battery cells and the heat sink increases, a cooling efficiency may be degraded.

(Patent document 1) KR10-2014-0077272 A

SUMMARY

The present disclosure provides a battery module capable of effectively cooling a plurality of battery cells by using a heat sink.

The present disclosure also provides a battery module capable of restricting or preventing a heat sink from being deformed.

In accordance with an exemplary embodiment, a battery module includes: an outer case having an accommodation space therein; an inner case having a storage space therein and installed in the accommodation space; a plurality of battery cells stored in the storage space; a heat sink disposed in the accommodation and installed between the inner case and one side wall of the outer case to cool the battery cells; and a pressing part disposed in the accommodation space and having at least a portion installed between the other side wall of the outer case, which is opposite to the one side wall, and the inner case to press the inner case toward the heat sink.

The pressing part may include: a pressing member brought into contact with the inner case to press the inner case; and a plurality of coupling members coupled to the one side wall of the outer case through the other side wall of the outer case, the pressing member, the inner case, and the heat sink. Here, the coupling member may couple the outer case, the pressing member, the inner case, and the heat sink into one body.

The pressing member may have a hollow shape.

The coupling members may be arranged along a circumference of the inner case.

A pressing projection that protrudes toward the inner case may be provided on a surface of the pressing member, which contacts the inner case, and an insertion groove to which the pressing projection may be inserted is defined in a surface of the inner case, which contacts the pressing member.

A cooling projection that protrudes toward the inner case may be provided on a surface of the heat sink, which contacts the inner case, and a through hole through which the cooling projection passes may be defined in a surface of the inner case, which contacts the heat sink.

Each of the cooling projection and the through-hole may be provided in plurality, and the cooling projections may respectively contact the battery cells through the through-holes.

Each of the cooling projection and the through-hole may be provided in plurality, a cooling plate may be installed between the battery cells and a wall of the inner case, and the cooling projections may contact the cooling plate through the through-holes.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
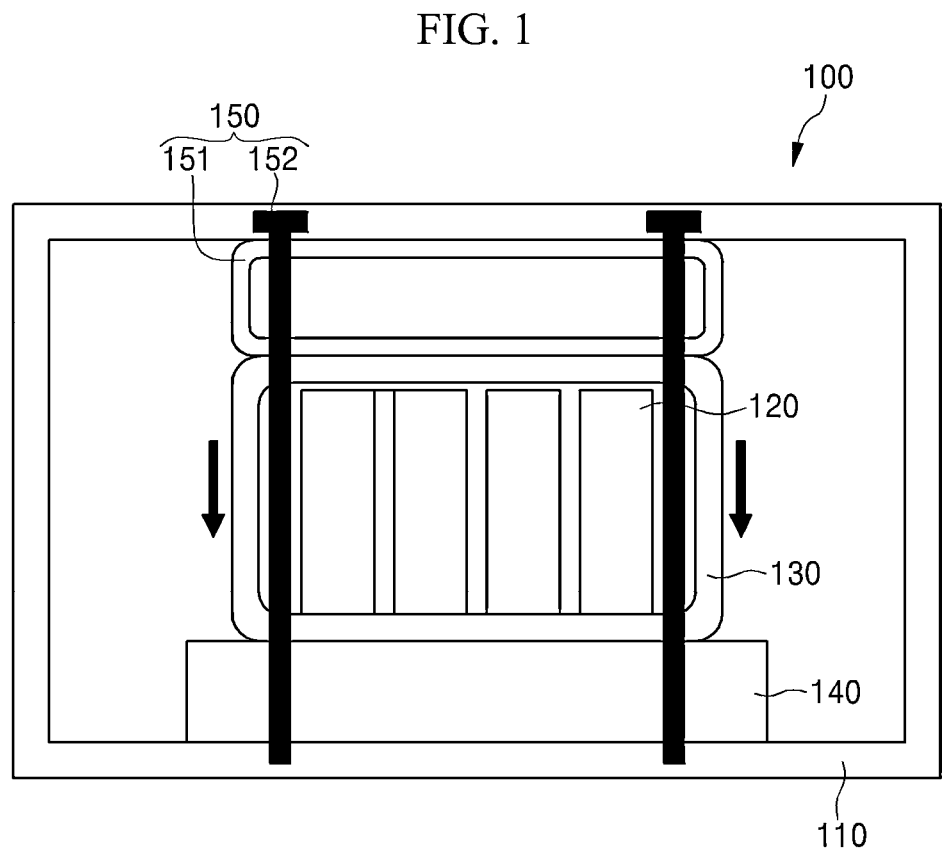
FIG. 1 is a view of a structure of a battery module in accordance with an exemplary embodiment.

Hereinafter, specific embodiments will be described in detail with reference to the accompanying drawings. The present disclosure may, however, be embodied in many different forms and should not be construed as being limited to the embodiments set forth herein; rather, these embodiments are provided so that this disclosure will be thorough and complete, and will fully convey the concept of the invention to those skilled in the art. In the figures, the dimensions of layers and regions are exaggerated for clarity of illustration, and like reference numerals refer to like elements throughout.

Figure 2:
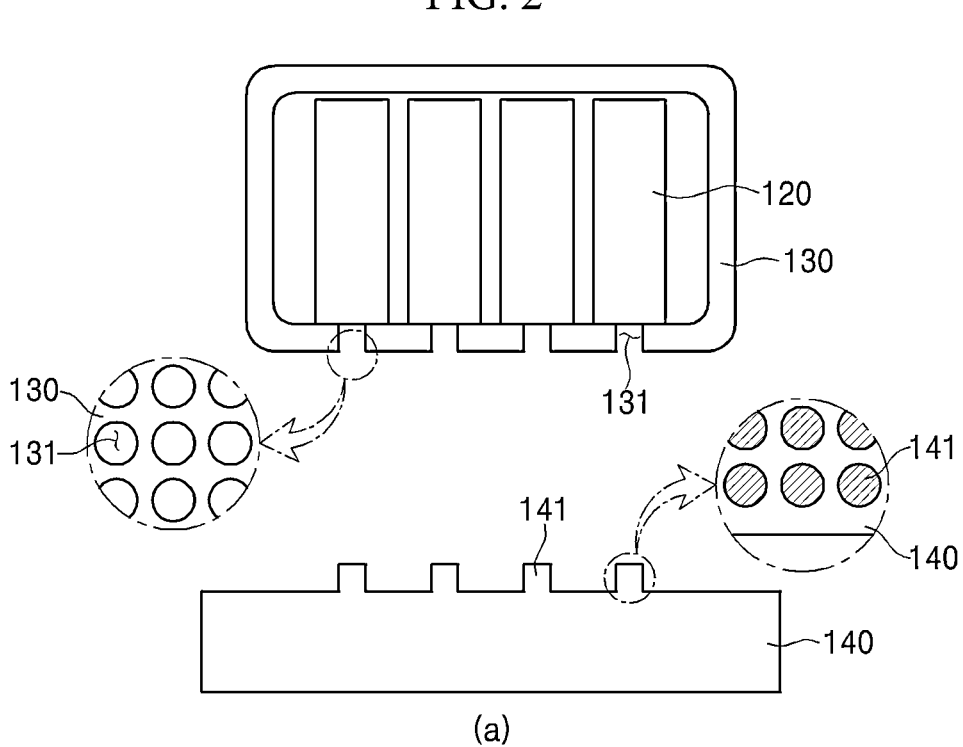
FIG. 2 is a view illustrating a connection structure of an inner case and a heat sink in accordance with an exemplary embodiment.
Figure 2:
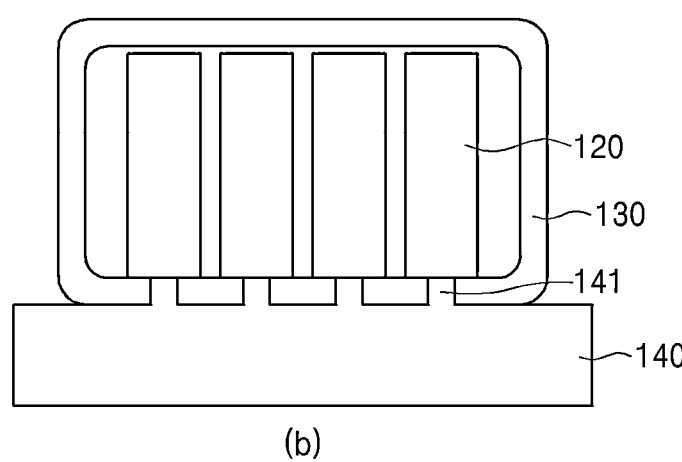
Figure 3:
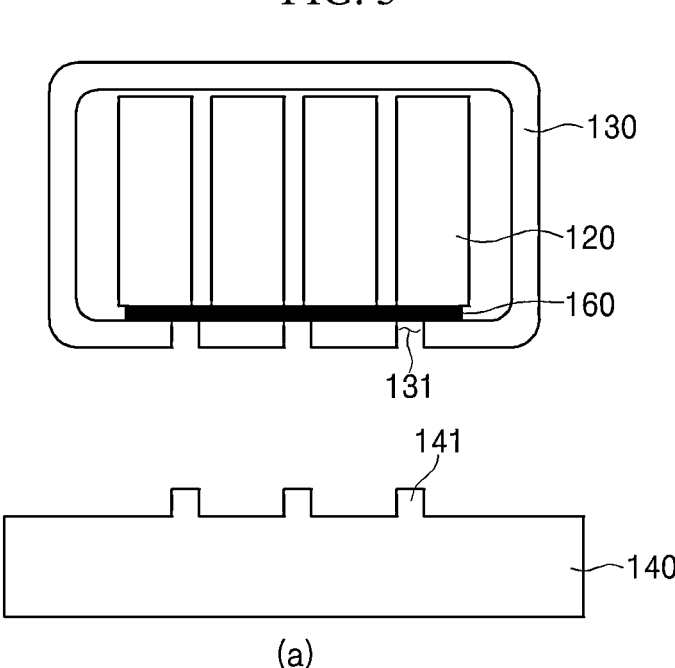
FIG. 3 is a view illustrating a connection structure of an inner case and a heat sink in accordance with another exemplary embodiment.
Figure 3:
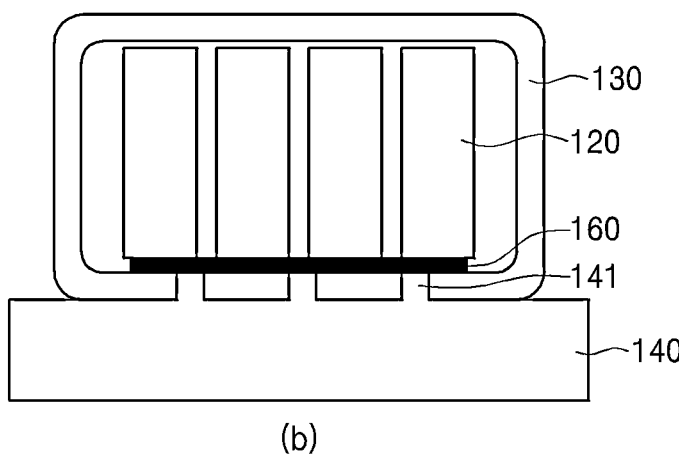
Figure 4:
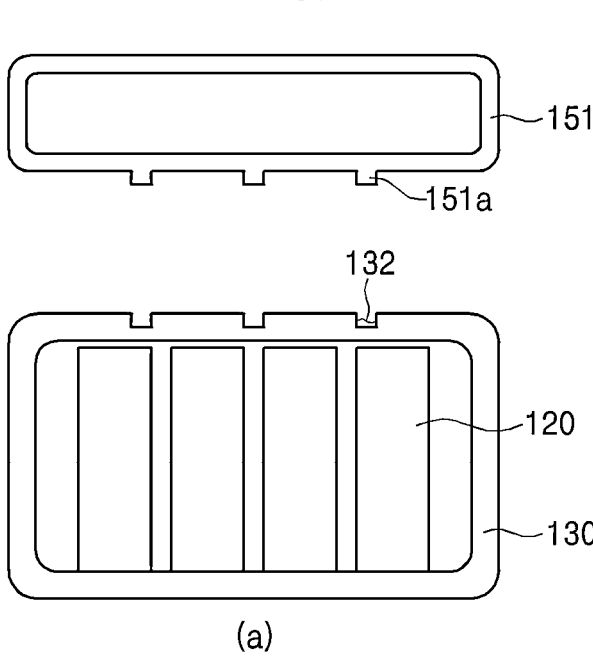
FIG. 4 is a view illustrating a connection structure of a pressing member and the heat sink in accordance with an exemplary embodiment.
Figure 4:
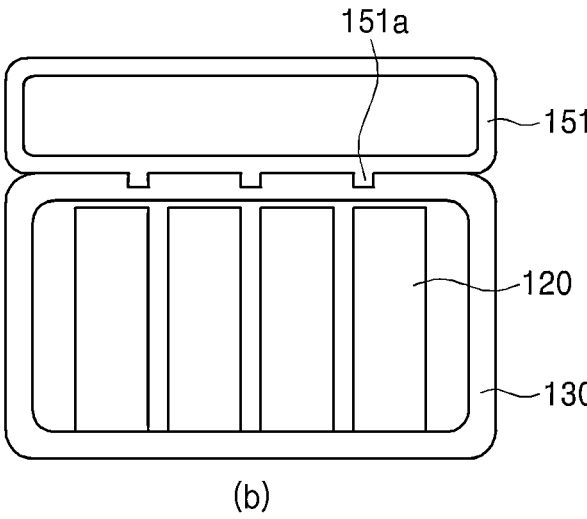

FIG. 1 is a view illustrating a structure of a battery module in accordance with an exemplary embodiment, FIG. 2 is a view illustrating a connection structure of an inner case and a heat sink in accordance with an exemplary embodiment, FIG. 3 is a view illustrating a connection structure of an inner case and a heat sink in accordance with another exemplary embodiment, and FIG. 4 is a view illustrating a connection structure of a pressing member and the heat sink in accordance with another exemplary embodiment.

The battery module in accordance with an exemplary embodiment is a device for supplying a power to electronic equipment or an electronic device. Referring to FIG. 1, a battery module 100 includes an outer case 110, a battery cell 120, an inner case 130, a heat sink 140, and a pressing part 150.

The outer case 110 has an accommodation space therein. For example, the outer case 110 may have a cuboid box shape. Thus, the inner case 130, the heat sink 140, and the pressing part 150 may be accommodated in the accommodation space.

Here, the outer case 110 may include an outer case main body in which an opening is formed in at least a portion thereof and an outer case cover formed in the outer case main body to open and close the opening. Thus, the inner case 130, the heat sink 140, and the pressing part 150 may be put into the accommodation space through the opening and be installed therein. However, the exemplary embodiment is not limited to the structure and the shape of the outer case 110. For example, the outer case 110 may have various structures and shapes.

The battery cell 120 may have a cylindrical shape. The battery cell 120 may be provided in plurality. The battery cells 120 may be stored in the inner case 130. For example, the battery cells 120 may be arranged at predetermined positions in the inner case 130.

The inner case 130 has a storage space therein for storing the battery cells. For example, the inner case 130 may have a cuboid box shape. Thus, the batter cells 120 may be stored in the storage space.

Also, the inner case 130 may have a volume less than an internal volume of the outer case 110. Thus, the inner case 130 may be installed in the accommodation space of the outer case 110. The inner case 130 may be spaced apart from an inner wall of the outer case 110.

Here, the inner case 130 may include an inner case main body in which an opening is formed in at least a portion thereof and an inner case cover formed in the inner case main body to open and close the opening. Thus, the battery cells 120 may be put into the storage space through the opening and be installed therein. However, the exemplary embodiment is not limited to the structure and the shape of the inner case 130. For example, the inner case 110 may have various structures and shapes.

The heat sink 140 is disposed in the accommodation space of the outer case 110. The heat sink 140 may be installed between the inner case 130 and one side wall of the outer case 110. For example, an upper portion of the heat sink 140 may contact a lower portion of the inner case 130, and a lower portion of the heat sink 140 may contact an inner bottom surface of the outer case 110.

Here, a separate thermal interface material (TIM) may not be installed between the inner case 130 and the heat sink 140. Thus, as a distance between the battery cells 120 and the heat sink 140 decreases, the heat sink 140 may effectively cool the battery cells 120.

Also, a flow path through which a refrigerant flows may be formed in the heat sink 140. For example, the refrigerant may be a coolant. The refrigerant may absorb heat from the battery cells 120 while passing through the flow path of the heat sink 140. Thus, the heat sink 140 may cool the battery cells 120.

Here, a top surface of the heat sink 140 may have an area equal to or greater than that of a bottom surface of the inner case 130. Thus, since the heat sink 140 may contact the entire bottom surface of the inner case 130, the heat sink 140 may easily cool all of the battery cells 120 stored in the inner case 130.

Also, the heat sink 140 may be made of a material having a high thermal conductivity. For example, the heat sink 140 may be made of aluminum or an aluminum alloy material. Thus, the heat sink 140 may easily absorb heat generated from the battery cells 120.

As illustrated in FIG. 2, the heat sink 140 may include a cooling projection 141. The cooling projection 141 may protrude from a surface (or top surface) of the heat sink 140, which contacts the inner case 130, toward the inner case 130 (or in an upward direction). For example, the cooling projection 141 may have a cylindrical shape. However, the exemplary embodiment is not limited to the shape of the cooling projection 141. For example, the cooling projection 141 may have various shapes.

Here, as illustrated in (a) of FIG. 2, a through-hole 131 through which the cooling projection 141 passes may be defined in a surface (or bottom surface) of the inner case 130, which contacts the heat sink 140. The cooling projection 141 may have a vertical length equal to or greater than that of the through hole 131. Thus, the cooling projection 141 of the heat sink 140 may directly contact the battery cell 120 in the inner case 130 through the through-hole 131. Thus, the heat sink 140 may further effectively cool the battery cell 120.

Also, the cooling projection 141 may be provided in plurality. The plurality of through-holes 131 may be provided as many as the number of the cooling projections 141. For example, each of the cooling projections 141 and the through-holes 131 may be provided as many as the number of the battery cells 120. Each of the cooling projections 141 and the through-holes 131 may be respectively arranged corresponding to positions of the battery cells 120. Thus, as illustrated in (b) of FIG. 2, the cooling projections 141 may pass the through-holes 131 and directly contact the battery cells 120, respectively. Thus, as the number of the battery cells 120 directly contacting the cooling projections 141 increases, the battery cells 120 may be further effectively cooled. However, the exemplary embodiment is not limited to the structure and the material of the heat sink 140 and the number of the cooling projections 141.

Here, when the cooling projections 141 are inserted into the through-holes 131, the inner case 130 and the heat sink 140 are aligned in position and stably coupled to each other. Thus, the battery module 100 may be easily manufactured and maintained.

Also, the battery module 100 may further include a cooling plate 150 as illustrated in (a) of FIG. 3. When the cooling plate 150 is provided, the cooling projections 141 may contact the cooling plate 150 instead of directly contacting the battery cells 120 as illustrated in (b) of FIG. 3. The cooling plate 150 may have an area less than that of the storage space of the inner case 130. Thus, the cooling plate 150 may be disposed in the storage space of the inner case 130. The cooling plate 150 may be installed between the battery cells and a wall of the inner case 130.

Also, the cooling plate 150 may be formed along a shape of a circumference of the storage space of the inner case 130. For example, the cooling plate 150 may have a rectangular plate shape. The cooling plate 150 may have a top surface contacting all of the battery cells 120 and a bottom surface contacting the cooling projections 141. That is, the cooling projections 141 may pass the through-holes 131 and directly contact the cooling plate 150 in the inner case 130. Thus, the cooling plate 150 may absorb heat generated from all of the battery cells 120, and the heat sink 140 may absorb heat of the cooling plate 150. Thus, although the number of the cooling projections 141 is less than that of the battery cells 120, or the cooling projections 141 and the battery cells 120 are not aligned in position, the heat sink 140 may easily absorb the heat of all of the battery cells 120 through the cooling plate 150.

Here, the cooling plate 150 may be made of a material having a high thermal conductivity. For example, the cooling plate 150 may be made of aluminum or an aluminum alloy material. Thus, the cooling plate 150 may easily transfer the heat generated from the battery cells 120 to the heat sink 140. However, the exemplary embodiment is not limited to the shape and the material of the cooling plate 150. For example, the cooling plate 150 may have various shapes and include various materials.

The pressing part 150 is disposed in the accommodation space of the outer case 110. The pressing part 150 may be installed between the inner case 130 and the other side wall (or an upper wall) of the outer case 110, which is opposite to one side wall (or a lower wall) of the outer case 110. The pressing part 150 may press the inner case 130 toward the heat sink 140 (or in a downward direction), so that the inner case 130 closely contacts the heat sink 140. The pressing part 150 includes a pressing member 151 and a coupling member 152.

The pressing member 151 may be formed along a shape of a circumference of the inner case 130. The pressing member 151 has an upper portion contacting an inner ceiling surface of the outer case 110 and a lower portion contacting an upper portion of the inner case 130. Thus, the pressing member 151 is disposed at an opposite side of the heat sink 140 with the inner case 130 therebetween. Thus, the pressing member 151, the inner case 130, and the heat sink 140 may be arranged in a row along a vertical direction in the accommodation space of the outer case 110.

Here, a bottom surface of the pressing member 151 may have an area equal to or greater than that of a top surface of the inner case 130. Thus, since the heat sink 140 may contact the entire top surface of the inner case 130, the pressing member 151 may uniformly press the entire top surface of the inner case 130 in the downward direction. Thus, the entire inner case 130 may uniformly and closely contact the heat sink 140.

Also, the pressing member 151 may be made of a material having a high thermal conductivity. For example, the pressing member 151 may be made of aluminum or an aluminum alloy material. Thus, the heat generated from the battery cells 120 may be transferred to the inner case 130, and the pressing member 151 may dissipate the heat of the inner case 130. Thus, as heat generated from upper ends of the battery cells 120 is dissipated by the pressing member 151, and lower ends of the battery cells 120 are cooled by the heat sink 140, temperature increase of the battery cells 120 may be effectively restricted or prevented.

Here, the pressing member may have a hollow shape. That is, the pressing member 151 may have a pipe shape having an empty inside when cut into a cross-section. Thus, a weight of the pressing member 151 may be reduced. Also, a weight of the battery module 100 may be reduced.

Also, since the pressing member 151 has the hollow shape, the shape of the pressing member 151 may be easily deformed by a force applied from the outside. That is, the pressing member 151 may have elasticity. Thus, the pressing member 151 may press the heat sink 140 with flexibility. Thus, the pressing member 151 may stably increase a force of pressing the heat sink 140 while preventing or restricting a damage of the pressing member 151.

As illustrated in FIG. 4, a pressing projection 151*a* may be provided on the pressing member 151. The pressing projection 151*a* may protrude from a surface (or a bottom surface) of the pressing member, which contacts the inner case 130, toward the inner case 130 (or in the downward direction). For example, the pressing projection 151*a* may have a cylindrical shape. However, the exemplary embodiment is not limited to the shape of the pressing projection 151*a*. For example, the pressing projection 151*a* may have various shapes.

Here, as illustrated in (a) of FIG. 4, an insertion groove 132 to which the pressing projection 151*a* is inserted may be defined in a surface (or a top surface) of the inner case 130, which contacts the pressing member 151. The pressing member 151 and the inner case 130 may be stably coupled to each other by the pressing projection 151*a* and the insertion groove 132.

Also, the pressing projection 151*a* may be provided in plurality. The insertion groove 132 may be also provided in plurality as many as the number of the pressing projections 151*a*. The pressing projections 151*a* may be respectively inserted to different insertion grooves 132. As illustrated in (b) of FIG. 4, the pressing member 151 and the inner case 130 may be further stably coupled to each other as a contact area of the pressing member 151 and the inner case 130 increases, and the pressing member 151 may further effectively dissipate the heat generated from the battery cells 120 through the inner case 130. However, the exemplary embodiment is not limited to the structure and the material of the pressing member 151 and the number of the pressing projections 151*a*.

Here, when the pressing projections 151*a* are inserted into the insertion grooves 132, the pressing member 151 and the inner case 130 may be aligned in position. Since the positions of the inner case 130 and the heat sink 140 are aligned by the cooling projections 141 and the through-holes 131, the pressing member 151, the inner case 130, and the heat sink 140 may be easily aligned in the vertical direction. Thus, the battery module 100 may be easily manufactured and maintained.

The coupling member 152 may have a bolt shape. The coupling member 152 may adjust a degree in which the pressing member 151 presses the inner case 130. When the coupling member 152 is tightened, the pressing member 151 may further strongly press the inner case 130 in the downward direction, and when the coupling member 152 is loosened, the force of the pressing member 151 for pressing the inner case 130 in the downward direction may be weakened.

Also, the coupling member 152 may extend in the vertical direction. A vertical length of the coupling member 152 may be greater than that of the accommodation space of the outer case 110 and less than that of the entire outer case 110. Thus, the coupling member 152 may be coupled to one side wall (or a lower wall) of the outer case 110 through the other side wall (or an upper wall) of the outer case 110, the pressing member 151, the inner case 130, and the heat sink 140. Thus, the coupling member 152 may couple the outer case 110, the pressing member 151, the inner case 130, and the heat sink 140 into one body so that the outer case 110, the pressing member 151, the inner case 130, and the heat sink 140 are stably coupled.

Here, the coupling member 152 may pass through the inner case 130 and the heat sink 140 while being spaced apart from the battery cells 120 and the flow path formed in the heat sink 140. Thus, when the coupling member 152 passes, the coupling member 152 may not damage the battery cells 120 or the flow path.

Also, the coupling member 152 may be provided in plurality. The coupling members 152 may be arranged along the circumference of the inner case 130. The pressing member 151 may uniformly press the entire top surface of the inner case 130 in a downward direction, and the inner case 130 may uniformly press the entire top surface of the heat sink 140 by the pressing member 151 in the downward direction.

Here, when a separate thermal interface material (TIM) is not installed between the inner case 130 and the heat sink 140, the heat sink 140 may be deformed by a hydraulic pressure of the refrigerant because the top surface of the heat sink 140 is not uniformly pressed. However, since the entire top surface of the heat sink 140 is uniformly pressed as the inner case 130 closely contacts the top surface of the heat sink 140 by the pressing member 151 and the coupling member 152, deformation of the heat sink 140 may be restricted or prevented.

Also, the coupling member 152 may be made of a material having a high thermal conductivity. For example, the coupling member 152 may be made of aluminum or an aluminum alloy material. Thus, the coupling member 152 may easily transfer heat of the storage space of the inner case 130 to the pressing member 151 or the heat sink 140. Here, the battery cells 120 stored in the storage space of the inner case 130 may be further effectively cooled. However, the exemplary embodiment is not limited to the structure and the material of the coupling member 152 and a passing or coupling direction of the coupling member 152. For example, the coupling member 152 may have various structures, include various materials, and have various passing or coupling directions.

Hereinafter, a method for manufacturing a battery module 100 will be described. The method for manufacturing the battery module 100 may include: a process of storing battery cells 120 in a storage space of an inner case 130; a process of installing a pressing member 151, an inner case 130, and a heat sink 140 in an accommodation space of an outer case 110; and a process of coupling the outer case 110, the pressing member 151, the inner case 130, and the heat sink 140 by a coupling member 152.

Here, the battery cells 120 may be stored in a storage space of the inner case 130. That is, the battery cells 120 may be put into the storage space through an opened portion of an inner case main boy and then arranged at predetermined positions in a standing state. When all of the battery cells 120 are stored, an inner case cover may be installed on the inner case main body to block the opened portion of the inner case main body.

Thereafter, the pressing member 151, the inner case 130, and the heat sink 140 may be installed in the accommodation space of the outer case 110. That is, the pressing member 151, the inner case 130, and the heat sink 140 may be put into the accommodation space through an opened portion of the outer case main body. When all of the pressing member 151, the inner case 130, and the heat sink 140 are installed in the accommodation space, an outer case cover may be installed on the outer case main body to block the opened portion of the outer case main body.

Specifically, pressing projections 151*a* of the pressing member 151 may be inserted to insertion grooves 132 in a top surface of the inner case 130, and cooling projections 141 of the heat sink 140 may be inserted to through-holes 131 in a bottom surface of the inner case 130. Thus, positions of the pressing member 151, the inner case 130, and the heat sink 140 may be arranged in a vertical direction in the accommodation space of the outer case 110.

Here, a separate thermal interface material (TIM) may not be installed between the inner case 130 and the heat sink 140. Thus, the heat sink 140 may be disposed closer to the battery cells 120. Thus, the heat sink 140 may effectively cool the battery cells 120.

The cooling projections 141 may pass the through-holes 131 and directly contact the battery cells 120 stored in the inner case 130. Alternatively, when a cooling plate 150 is installed in the inner case 130, the cooling projections 141 may pass the through-holes 131 and contact the cooling plate 150. Thus, as a distance between the heat sink 140 and the battery cells 120 decreases, the heat sink 140 may be disposed closer to the battery cells 120.

Thereafter, the coupling member 152 may couple the outer case 110, the pressing member 151, the inner case 130, and the heat sink 140. That is, the coupling member 152 may be coupled to a lower wall of the outer case 110 through an upper wall of the outer case 110, the pressing member 151, the inner case 130, and the heat sink 140.

Here, the coupling member 152 may pass a position at which the battery cells 120 are not disposed in the storage space of the inner case 130 and a portion at which a flow path is not formed in the heat sink 140. When the coupling member 152 passes the inner case 130 or the heat sink 140, the battery cells 120 or the flow path may be prevented from being damaged.

Also, a plurality of coupling members 152 may be arranged along a circumference of the inner case 130. Thus, the pressing member 151 may uniformly press the entire top surface of the inner case 130 by the coupling member 152 in a downward direction, and the inner case 130 may uniformly press the entire top surface of the heat sink 140 by the pressing member 151 in the downward direction. Thus, as the inner case 130 closely contacts the heat sink 140, deformation of the heat sink 140 may be restricted or prevented.

Here, a strength of a force of the pressing member 151 for pressing the inner case 130 in the downward direction may be adjusted by the coupling members 152. For example, when the coupling member 152 is tightened downward, the pressing member 151 may further strongly press the inner case 130 in the downward direction, and when the coupling member 152 is loosened upward, the force of the pressing member 151 for pressing the inner case 130 in the downward direction may be weakened. Thus, a degree in which the inner case 130 presses the heat sink 140 may be adjusted so that the inner case 130 stably and closely contact the heat sink 140.

As described above, a distance between the battery cells 120 and the heat sink 140 may decrease. Thus, the heat sink 140 may absorb heat generated from the battery cells 120 at a position close to the battery cells 120. Thus, the battery cells 120 may be effectively cooled by using the heat sink 140.

Also, the inner case 130 and the heat sink 140 may closely contact each other in an overall uniform manner by using the pressing part 150. Thus, deformation of the heat sink 140 may be restricted or prevented. Thus, the heat sink 140 may have an improved lifespan and durability to stably cool the battery cells 120.

In accordance with the exemplary embodiment, the distance between the battery cells and the heat sink may decrease. Thus, the heat sink may absorb the heat generated from the battery cells at the position close to the battery cells. Thus, the battery cells may be effectively cooled by using the heat sink.

Also, the case for storing the battery cells and the heat sink may closely contact each other in the overall uniform manner. Thus, the deformation of the heat sink may be restricted or prevented. Thus, the heat skin may have the improved lifespan and durability to stably cool the battery cells by using the heat sink.

Although a preferred embodiment of the present invention has been described in the detailed description of embodiments, various changes and modifications may be made thereto without departing from the scope and spirit of the present invention defined by the appended claims. Therefore, the scope of the invention is defined not by the detailed description of the invention but by the appended claims, and all differences within the scope will be construed as being included in the present invention.

What is claimed is:

1. A battery module comprising:
   an outer case having an accommodation space therein;

an inner case having a storage space therein, the inner case being in the accommodation space;

a plurality of battery cells in the storage space;

a heat sink in the accommodation space, the heat sink being between the inner case and a first side wall of the outer case and configured to cool the battery cells; and a pressing part in the accommodation space and having at least a portion between a second side wall of the outer case, which is opposite to the first side wall, and the inner case, wherein the pressing part is configured to press the inner case toward the heat sink wherein the pressing part comprises:

a pressing member in contact with the inner case to press the inner case; and a plurality of coupling members coupled to the first side wall of the outer case through the second side wall of the outer case, the pressing member, the inner case, and the heat sink, wherein the plurality of coupling members couples the outer case, the pressing member, the inner case, and the heat sink into one body.

2. The battery module of claim 1, wherein the pressing member has a hollow shape.

3. The battery module of claim 1, wherein the coupling members are disposed along a circumference of the inner case.

4. The battery module of claim 1, wherein a pressing projection that protrudes toward the inner case is on a surface of the pressing member, which contacts the inner case, and wherein an insertion groove to which the pressing projection is inserted is defined in a surface of the inner case, which contacts the pressing member.

5. The battery module of claim 1, wherein a cooling projection that protrudes toward the inner case is on a surface of the heat sink, which contacts the inner case, and wherein a through-hole through which the cooling projection passes is defined in a surface of the inner case, which contacts the heat sink.

6. The battery module of claim 5, wherein the cooling projection includes a plurality of cooling projections, and the through-hole includes a plurality of through-holes, and wherein the cooling projections respectively contact the battery cells through the through-holes.

7. The battery module of claim 5, wherein the cooling projection includes a plurality of cooling projections, and the through-hole includes a plurality of through-holes, wherein a cooling plate is between the battery cells and a wall of the inner case, and wherein the cooling projections contact the cooling plate through the through-holes.

* * * * *